United States Patent
Park et al.

(10) Patent No.: US 8,209,593 B2
(45) Date of Patent: Jun. 26, 2012

(54) METHOD AND DVB-H TERMINAL FOR CONFIRMING INTEGRITY OF CONTAINER

(75) Inventors: Ji-Ho Park, Seoul (KR); Hyung-Hoon Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1184 days.

(21) Appl. No.: 12/022,612

(22) Filed: Jan. 30, 2008

(65) Prior Publication Data

US 2008/0184299 A1    Jul. 31, 2008

(30) Foreign Application Priority Data

Jan. 30, 2007   (KR) .................. 10-2007-0009502

(51) Int. Cl.
 *H03M 13/09* (2006.01)
(52) U.S. Cl. ....................................... 714/807
(58) Field of Classification Search .................. 714/807
See application file for complete search history.

(56) References Cited

U.S. PATENT DOCUMENTS

| | | | | |
|---|---|---|---|---|
| 6,148,340 | A * | 11/2000 | Bittinger et al. | 709/224 |
| 6,430,608 | B1 * | 8/2002 | Shaio | 709/217 |
| 7,308,462 | B1 * | 12/2007 | Clarkson et al. | 1/1 |
| 7,549,148 | B2 * | 6/2009 | Cross et al. | 717/174 |
| 7,712,015 | B1 * | 5/2010 | Li | 714/807 |
| 2005/0262419 | A1 | 11/2005 | Becker et al. | |
| 2011/0116500 | A1 * | 5/2011 | Petry et al. | 370/389 |
| 2011/0194492 | A1 * | 8/2011 | Vare et al. | 370/328 |
| 2011/0197229 | A1 * | 8/2011 | Yassa | 725/39 |
| 2011/0235724 | A1 * | 9/2011 | Kim et al. | 375/240.27 |
| 2011/0244876 | A1 * | 10/2011 | Ponnampalam et al. | 455/450 |

FOREIGN PATENT DOCUMENTS

KR   1020070051538    5/2007
KR   10-0790179    12/2007

* cited by examiner

*Primary Examiner* — Stephen Baker
(74) *Attorney, Agent, or Firm* — The Farrell Law Firm, P.C.

(57) ABSTRACT

Disclosed is a method for ensuring the integrity of a container to be transmitted to a Digital Video Broadcasting-Handheld (DVB-H) terminal. A DVB-H server divides a container in which data required to deliver broadcasting information is included into one or more sections, extracts a Cycle Redundancy Check (CRC) value related to data of each section, and then creates profile information of the container. The created profile information of the container is used to check the integrity of the container, and is transmitted following the addition of the created profile information to a header part of the container. Hence, the terminal compares data of an actually received container with data of a container which has to be received on the basis of the profile information related to the container, and determines if the data included in the container is lost.

14 Claims, 3 Drawing Sheets

| INDEX<br>(Index-No1) | DATA LENGTH OF SECTION<br>(Length-No1) | CRC<br>(CRC-No1) |

METHOD AND DVB-H TERMINAL FOR CONFIRMING INTEGRITY OF CONTAINER

PRIORITY

This application claims priority under 35 U.S.C. §119(a) to an application entitled "Method and DVB-H Terminal for Confirming Integrity of Container" filed in the Korean Industrial Property Office on Jan. 30, 2007 and assigned Serial No. 2007-0009502, the contents of which are hereby incorporated by reference.

BACKGROUND OF THE INVENTION

1. Field of the Invention

The present invention relates to a Digital Video Broadcasting-Handheld (DVB-H) terminal, and more particularly to a method and a DVB-H terminal for ensuring the integrity of a container in the case where the container is to be transmitted from a DVB-H server to the DVB-H terminal.

2. Description of the Related Art

DVB-H implies technical standards which have been established for the purpose of improving the receptibility of mobile Digital TeleVision (DTV), and the letter 'H' represents 'Handheld.' The standards support mobile multimedia broadcasting, which provides high quality audio and image services anytime and anywhere, even while driving or walking.

A service model using this DVB-H has the following configuration. Above all, a sending side is configured with a network through which common carriers and broadcasters interact with one another according to standards of the Digital Video Broadcasting-Universal Mobile Telecommunications System (DVB-UMTS). The broadcasters deliver compressed data to a DVB-H terminal (hereinafter, referred to as a "terminal") in a transmission scheme of the DVB-H on the basis of the standards of the Digital Video Broadcasting-Advanced Video Coding (DVB-AVC). The terminal communicates with the common carriers according to communication standards such as the Digital Video Broadcasting-Universal Mobile Telecommunications System/Global System for Mobile communication (DVB-UMTS/GSM), and is able to deliver information on the receiving-side to the broadcasters in real time via a communication network.

Most of the information pertinent to the broadcasting is included in an Electric Service Guide (ESG) in DVB-H, and by receiving the ESG, the terminal acquires information required to receive a service provided by a service provider by receiving an ESG stream. When a user has selected a specified service, by using the acquired information, the terminal gains access to a transmitted data stream so as to provide the service, and then receives data. The information required for the terminal to gain access to the data stream is transmitted by using ESG fragments.

According to the ESG data model, fragments of the ESG data, classified by fragments, are grouped into one fragment set containing several fragments, and are then included in one container, which is considered and transmitted as one object during a flute session. Herein, the terminal can receive a container including data by using a scheme called flute carousel which refers to a scheme in which the terminal receives a container if a DVB-H transmission server continues to send the container on the air over different periods of time.

The above terminal can offer the digital broadcasting services only if the terminal always must receive the ESG data. The terminal also experiences the occurrence of a service interruption due to various kinds of factors while receiving data needed to execute the digital broadcasting services. Accordingly, in a case where the terminal does not receive a container or does not receive data caused by unstable reception conditions, the terminal must wait until the DVB-H server transmits normal data again.

In a case where data is lost or reception is completed while receiving data by using the flute carousel scheme, the terminal performs a continuous download by using the following method. A flute packet includes sequence numbers classifying files, and the terminal makes decisions after detecting the sequence numbers. When a file is transmitted, the file is divided into blocks each of which is divided into symbols, and a unit of symbols is matched with the size of the flute packets transmitted via a network. At this time, each symbol has a sequence number representing itself. Each block has information on how many symbols it includes, connects symbols on receiving the symbols by using a list to which each block is internally linked, and finally merges the connected symbols. Therefore, the container can be subsequently received when the transmission order of an interrupted container comes only after receiving other containers of the DVB-H flute carousel. This method has features that are almost similar to features of a method for a continuous download of a general Peer-to-Peer (P2P) processing.

SUMMARY OF THE INVENTION

As described above, in the case where a terminal does not receive a container in which ESG data is carried in a DVB-H system using a multiple stream mode, the terminal has to wait until a DVB-H transmission server retransmits the container in which the ESG data is carried. Moreover, even if the terminal performs a continuous download following the resumption of retransmission of data, the terminal confirms from which sequence an error occurs only after extracting all sequence numbers included in packets by analyzing the packets one by one, and must receive a packet corresponding to an erroneous sequence from a DVB-H server during the next broadcasting period.

Accordingly, the present invention has been made to solve at least the above-stated problems occurring in the prior art, and the present invention provides a method and a DVB-H terminal for confirming the integrity of a container, in which the DVB-H terminal can make an efficient check on whether data of the container has been lost even if the container transmitted from a DVB-H server is lost during transmission of the container.

Also, the present invention provides a method and a DVB-H terminal for confirming the integrity of a container, in which the DVB-H terminal makes an efficient check on whether data of the container has been lost even if the container transmitted from a DVB-H server is lost during transmission of the container, and can improve the receiving speed.

In accordance with an aspect of the present invention, there is provided a method for confirming the integrity of a container according to an embodiment of the present invention, including on receiving the container acquiring from the received container profile information necessary to check the integrity of a received container; obtaining information related to at least one section into which the container is divided by the prescribed length from the profile information; and checking the integrity related to data in the container by the length corresponding to the section on the basis of the obtained information.

In accordance with another aspect of the present invention, there is provided a DVB-H terminal for confirming the integrity of a container according to an embodiment of the present invention, including a digital broadcasting receiving unit for receiving a container; and a control unit for on receiving the container through the digital broadcasting receiving unit acquiring from the received container profile information necessary to check the integrity of a received container, for obtaining information related to at least one section into which the container is divided by the prescribed length from the profile information, and for checking the integrity related to data in the container by the length equivalent to the section on the basis of the obtained information.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described in detail with reference to the accompanying drawings. In the following description of the present invention, a detailed description of known functions and configurations incorporated herein is omitted when it may make the subject matter of the present invention rather unclear.

The present invention provides a method for ensuring the integrity of a container transmitted to a DVB-H terminal. To this end, a DVB-H server divides into one or more sections a container which contains data required to deliver broadcasting information, extracts a Cycle Redundancy Check (CRC) value related to the data of each section, and then creates profile information of the container. The created profile information of the container is used to check the integrity of the container, and is transmitted after the created profile information is added to a header part of the container. Hence, the terminal compares the data of an actually received container with the data of a container which has yet to be received on the basis of the profile information related to the container, and determines if the data included in the container is lost. In this manner, when receiving the container, the terminal checks the integrity of the container without searching for sequence numbers one by one, and can easily confirm if the reception of container data is normal.

Figures 1, 2:
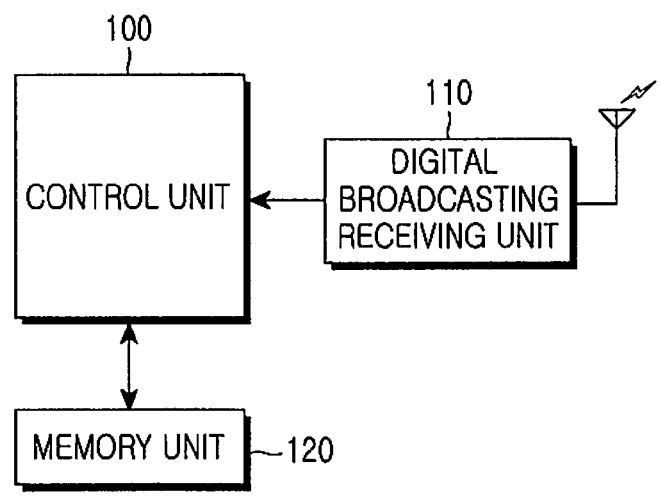
FIG. 1 is a block diagram illustrating an internal configuration of a DVB-H terminal according to an embodiment of the present invention.
FIG. 2 is a diagram illustrating a profile body according to an embodiment of the present invention.

A description will be made of the elements and the operation of a DVB-H terminal for operating as previously stated with reference to FIG. 1. FIG. 1 is a block diagram illustrating an internal configuration of the DVB-H terminal according to an embodiment of the present invention. The DVB-H terminal is configured to include a control unit 100, a digital broadcasting receiving unit 110, and a memory unit 120.

The digital broadcasting receiving unit 110 receives a transport stream from a service provider, i.e. from a DVB-H server, via a DVB-H network, and delivers the received transport stream to the control unit 100. The digital broadcasting receiving unit 110 receives a container to which container profile information is added. At this point, in the case of the reception of a transmitted packet, the control unit 100 can include its internally embodied operation for demultiplexing the transmitted packet, causing a demultiplexed packet to go through a decoding process, and parsing a decoded demultiplexed packet into video and audio data. Because an operation in each internally embodied configuration unit is obvious to those skilled in the art, a detailed description thereof will be omitted.

The control unit 100 processes voice signals and data according to protocols for wireless internet access and digital broadcasting, and controls each configuration unit of the DVB-H terminal. Particularly, the control unit 100 checks the integrity of a container every time a container is received. To this end, the control unit 100 calculates the total length of the container in advance. Then, the control unit 100 analyzes profile information added to a header part of the container. Specifically, the control unit 100 compares the total length of an actually received container with that of a container, which has yet to be received, on the basis of an index number of each section and the length of each section included in the container profile information.

If a result of the comparison shows that the two total lengths are not equal to each other, the control unit 100 waits in order to receive a normal container again without determining if data in the container is lost. Time necessary to process data in a container can be considered in the DVB-H terminal. If the result of the comparison shows that the two total lengths are equal to each other, the control unit 100 begins to calculate if the data in an actually received container is lost. To this end, the control unit 100 compares a CRC value of the data in the container corresponding to a relevant section with a CRC value of each section of a single container with reference to the container profile information, and determines which section inside the container contains the lost data. Through this process, the control unit 100 can determine if the container has been normally received. Accordingly, it is only when there exists no loss of data in the container that the control unit 100 parses a received container to be able to extract actual ESG data.

Also, if a result of the comparison indicates that the two CRC values are not equal to each other, the control unit 100 senses that a part of data in the container has not been received. The control unit 100 inspects a relevant section, and calculates which part of the data in the container has been lost. After storing the information on a lost section, the DVB-H uses the stored information on the lost section in order to receive only the lost data afterward. A description of how the lost data in the container is calculated will be made as follows.

In a case where the memory unit 120 simultaneously receives data in a received container without any loss with storing information on overall functions of the DVB-H terminal, the memory unit 120 stores information on offering broadcasting services included in the received container, e.g., ESG data. The memory unit 120 stores the section information on which part of a container has been lost, and the section information is used to later receive only the lost data.

In the present invention, container profile information is used as a point of reference to determine if data in a container is lost, and a profile body corresponding to elements constructing the container profile information has the structure illustrated in FIG. 2.

FIG. 2 is a diagram illustrating the profile body according to an embodiment of the present invention. FIG. 2 shows the profile body related to a single section, and the profile body includes information by each section. Specifically, the profile body is made up of an index (Index_No1) representing the order of a section, the data length (Length_No1) of the section, and the CRC (CRC_No1) related to data corresponding to the section.

A single container is divided into one or more sections by a predetermined length. The index is mapped into each section, and in a case where a container is divided by a 512-byte length, one index is given to each 512-byte. In this manner, one container can be divided by the 2048-byte besides by the 512-byte, which in turn makes each container comply with a basic storage unit of NAND flash in which containers are ultimately stored. A CRC value related to all data of each section assigned its index is extracted. Then, one section index and the CRC value are grouped into one bundle, which is added to one container. Therefore, in the case where the one container consists of only one section, a bundle of one section index and the CRC value is added to a container header in the form illustrated in FIG. 2.

Figure 3:
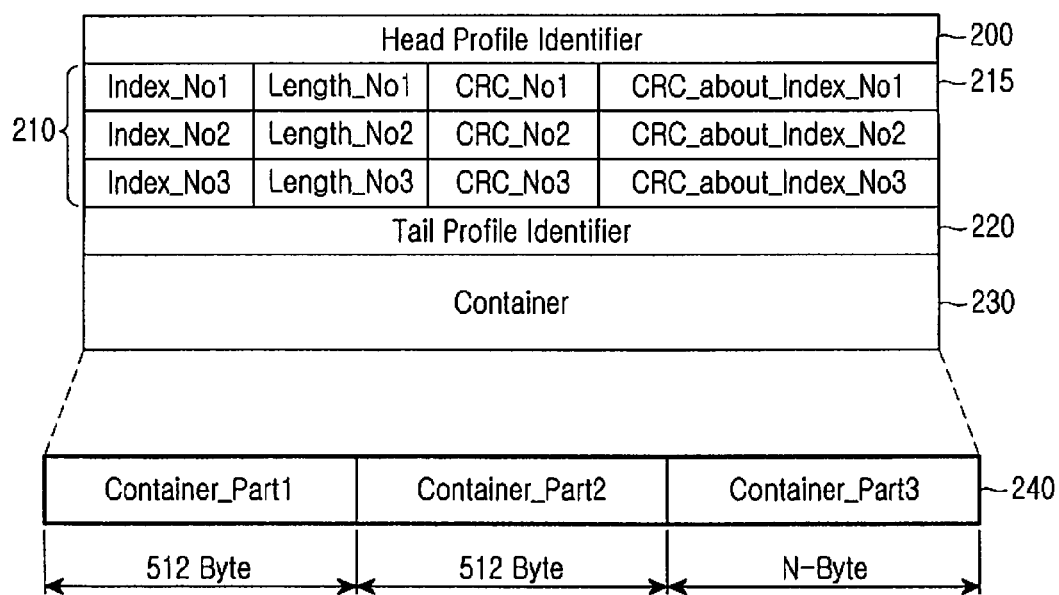
FIG. 3 is a diagram illustrating the structure of a container to which profile information is added according to an embodiment of the present invention.

If a single container is made up of multiple sections, a container having the structure illustrated in FIG. 3 is transmitted to the DVB-H terminal. FIG. 3 is a diagram illustrating the structure of a container to which profile information is added according to an embodiment of the present invention. FIG. 3 exemplifies a case where one container 230 is divided into three sections 240, each of which is assigned 512 bytes, and shows that the third sub-container (Container_Part3) has the rest of N bytes after the container 230 has been divided by the 512-byte. Also, FIG. 3 illustrates three bundles of profile bodies 210 added to a container header in relation to the container divided into three sections. As illustrated in FIG. 3, in order to represent the container header, i.e. the first part of the profile information, a head profile identifier 200 is added in front of the three bundles of profile bodies 210, and so as to represent the last part of the profile information, a tail profile identifier 220 is added to on the back of the three bundles of profile bodies 210.

As illustrated in FIG. 3, in regard to a bundle consisting of an index of the section, the length of data corresponding to the section, and a CRC value of the data corresponding to the section in relation to each of the sections 240, a CRC value (CRC_about_Index_No1) 215 related to the bundle can also be added together with the bundle in order to ensure the integrity even in relation to the bundle related to each section.

In a case where a container having added profile information is received, a description will be made of a process for checking the integrity related to the container with reference to FIG. 4, which is a flowchart illustrating a control procedure for checking the integrity of a container according to an embodiment of the present invention.

Figure 4:
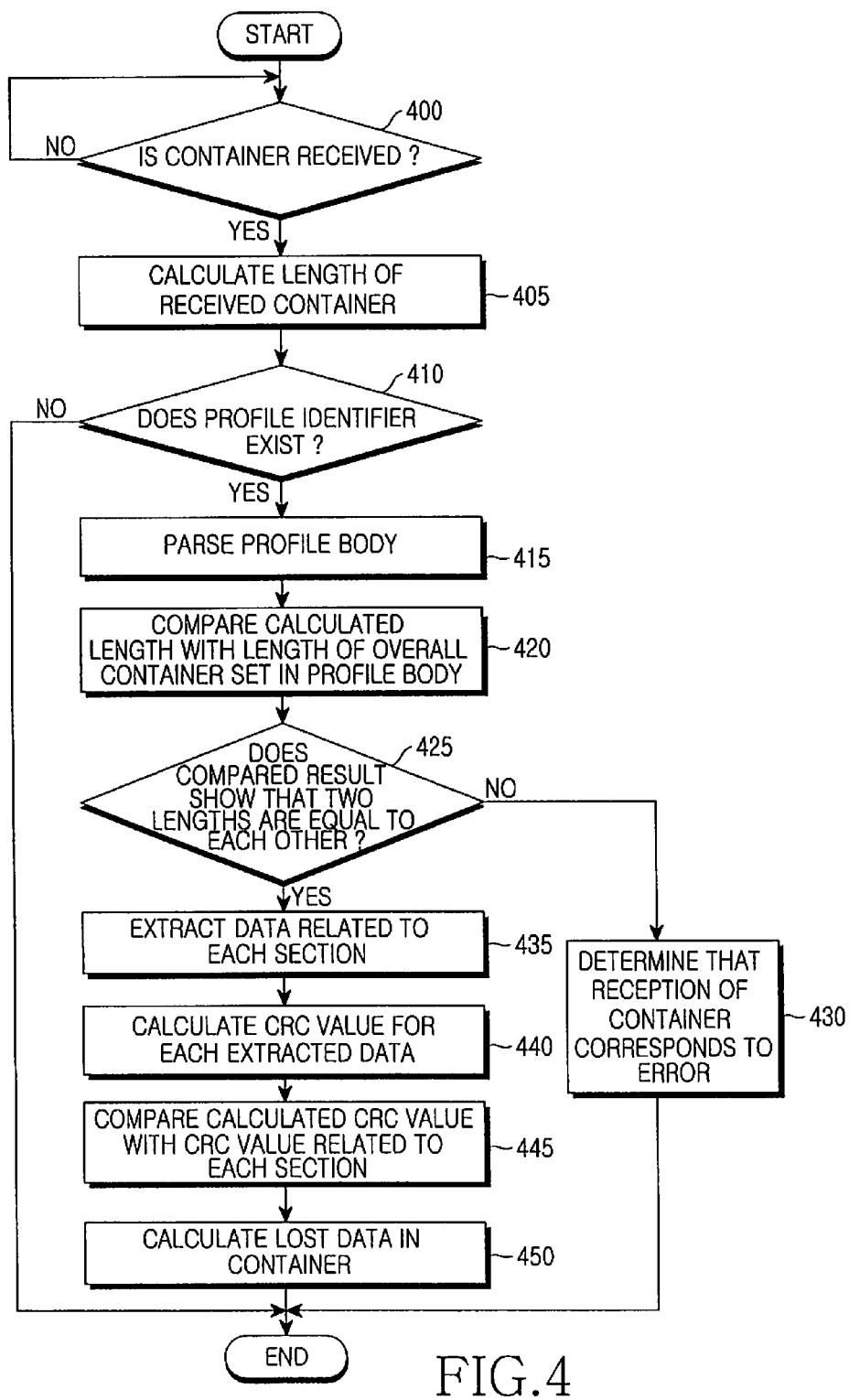
FIG. 4 is a flowchart illustrating a control procedure for checking the integrity of a container according to an embodiment of the present invention.

With reference to FIG. 4, the terminal checks the integrity related to a container every time a container is received, and accordingly in step 400, determines if a container is received. If it is determined in step 400 that a container is received, the terminal calculates the total length related to the received container in step 405. Namely, the total length of data carried in the received container is determined. In step 410, the terminal determines if there exists a profile identifier, e.g., a head profile identifier and a tail profile identifier, related to the received container. If it is determined in step 410 that there exists no profile identifier related to the received container, the terminal completes processing related to the received container, and waits for another container.

If there exists the profile identifier, the terminal proceeds to step 415, and parses a profile body between the head profile identifier and the tail profile identifier. The terminal can extract internal values from the profile body. In step 420, the terminal compares the length of the received container with the length of an overall container set in the profile body from among the values in the profile body. The length of the overall container set in the profile body is found by adding the respective lengths of data of sections all together. For example, in a case where the container as illustrated in FIG. 3 is received, the length of the overall container equals a value calculated by adding Length_No1, Length_No2, and Length_No3, corresponding to respective lengths of the sections.

Based on a compared result in step 420, the terminal determines in step 425 if the length of the received container equals that of the overall container. If it is determined in step 425 that the length of the received container does not equal that of the overall container, the terminal proceeds to step 430, and determines that the reception of the container corresponds to an error. Because the above determination means that the reception of data itself is not normally implemented, it is not necessary to check the integrity of the data carried in the container.

If it is determined in step 425 that the length of the received container equals that of the overall container, the terminal proceeds to step 435, and extracts data related to each section from the received container. Specifically, the terminal extracts an index of the profile body, and the data by the data length of the section corresponding to the index from the received container. Subsequently, in step 440, the terminal calculates a CRC value for all of the extracted data. In step 445, the terminal compares a CRC value related to each section of the profile body with the calculated CRC value. Through this comparing process, the terminal calculates in step 450 in which part the data has been lost inside the received container. Information on the loss of data calculated in this manner is stored. With this, the terminal can receive only the lost data again by using the information on the lost data.

As described above, according to the present invention, when receiving containers, a DVB-H terminal can receive only data carried in a necessary container, and therefore improves the receiving speed. Furthermore, when receiving the containers, the DVB-H terminal can improve the integrity of data in the container without searching for a sequence number of each symbol.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. A method for confirming the integrity of a container, the method comprising the steps of:
   (1) upon receiving a container by a digital broadcasting receiving unit, acquiring, from the received container, profile information necessary to check the integrity of the container:
   (2) obtaining, from the acquired profile information, information related to at least one section into which the container is divided, wherein the information related to the at least one section indicates a prescribed length for each of the at least one section: and
   (3) checking, on a basis of the obtained information, an integrity related to data in the container according to a calculated length corresponding to the at least one section,
   wherein step (1) comprises:

determining if there exists a profile identifier representing that profile information is added to the received container; and parsing a profile body between a head profile identifier representing the first part of the profile information and a tail profile identifier representing the last part of the profile information if it is determined that there exists the profile identifier.

2. The method as claimed in claim 1,
wherein the profile information is added to a header part of the received container.

3. The method as claimed in claim 1, wherein the profile body comprises:
an index representing the order of each section;
the length by each section; and
a CRC value by each section.

4. A method for confirming the integrity of a container, the method comprising the steps of:
(1) upon receiving a container by a digital broadcasting receiving unit, acquiring, from the received container, profile information necessary to check the integrity of the container:
(2) obtaining, from the acquired profile information, information related to at least one section into which the container is divided, wherein the information related to the at least one section indicates a prescribed length for each of the at least one section: and
(3) checking, on a basis of the obtained information, an integrity related to data in the container according to a calculated length corresponding to the at least one section,
wherein step (2) comprises:
determining the total data length related to the received container;
comparing the determined data length with a value calculated by adding the data lengths of respective sections in the profile information; and
acquiring information on the section if it is determined that the determined data length equals the calculated value.

5. The method as claimed in claim 4, which further comprises determining that the reception of the container corresponds to an error if it is determined that the determined data length does not equal the calculated value, and completing an operation for processing the received container.

6. The method as claimed in claim 4, wherein the profile information is added to a header part of the received container.

7. A method for confirming the integrity of a container, the method comprising the steps of:
(1) upon receiving a container by a digital broadcasting receiving unit, acquiring, from the received container, profile information necessary to check the integrity of the container:
(2) obtaining, from the acquired profile information, information related to at least one section into which the container is divided, wherein the information related to the at least one section indicates a prescribed length for each of the at least one section; and
(3) checking, on a basis of the obtained information, an integrity related to data in the container according to a calculated length corresponding to the at least one section,
wherein step (3) comprises:
extracting data from the received container by the data length corresponding to the section;
calculating a Cycle Redundancy Check (CRC) value of the extracted data;

comparing the calculated CRC value and a CRC value of each section among information on the acquired section; and determining that data has been lost in the received container through the comparison between the two CRC values.

8. The method as claimed in claim 7, wherein the profile information is added to a header part of the received container.

9. A method for confirming the integrity of a container, the method comprising the steps of:
(1) upon receiving a container by a digital broadcasting receiving unit, acquiring, from the received container, profile information necessary to check the integrity of the container;
(2) obtaining, from the acquired profile information, information related to at least one section into which the container is divided, wherein the information related to the at least one section indicates a prescribed length for each of the at least one section; and
(3) checking, on a basis of the obtained information, an integrity related to data in the container according to a calculated length corresponding to the at least one section,
wherein the profile information comprises:
a head profile identifier representing a first part of the profile information;
a tail profile identifier representing a last part of the profile information; and
a profile body including information by respective sections.

10. The method as claimed in claim 9, wherein the profile body comprises:
an index representing the order of each section;
the length by each section; and
a CRC value by each section.

11. The method as claimed in claim 9, wherein the profile information is added to a header part of the received container.

12. A Digital Video Broadcasting-Handheld (DVB-H) terminal for confirming the integrity of a Container, the DVB-H terminal comprising:
a digital broadcasting receiving unit for receiving a container; and
a control unit for on receiving the container through the digital broadcasting receiving unit acquiring from the received container profile information necessary to check the integrity of a received container, for obtaining, from the acquired profile information, information related to at least one section into which the container is divided, and for checking, on a basis of the obtained information, the integrity related to data in the container according to a length equivalent to the at least one section, wherein the information related to the at least one section indicates a prescribed length for each of the at least one section,
wherein the control unit determines if there exists a profile identifier representing that profile information is added to the received container, and acquires a profile body from between a head profile identifier representing the first part of the profile information and a tail profile identifier representing the last part of the profile information if it is determined that there exists the profile identifier.

13. The DVB-H terminal as claimed in claim 12, wherein the profile body comprises:
an index representing the order of each section;

the length by each section; and a CRC value by each section.

14. The DVB-H terminal as claimed in claim 13, wherein the control unit extracts data from the received container by the data length by each section, calculates a Cycle Redundancy Check (CRC) value of the extracted data, compares the calculated CRC value and a CRC value by each section; and determines if data has been lost in the received container based on the comparison between the two CRC values.

* * * * *